United States Patent
Qiu et al.

(10) Patent No.: US 7,103,147 B2
(45) Date of Patent: *Sep. 5, 2006

(54) METHODS AND APPARATUSES FOR DETERMINING LOOP CHARACTERISTICS USING STANDARD VOICE-BAND MODEM

(75) Inventors: Sigang Qiu, Raleigh, NC (US); Prashant Pratap Tawade, Raleigh, NC (US); Vedavalli G. Krishna, Raleigh, NC (US); Wesley H. Smith, Raleigh, NC (US); Mandayam G. Krishnan, Raleigh, NC (US); Bo G. Zhang, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 10/602,246

(22) Filed: Jun. 23, 2003

(65) Prior Publication Data

US 2004/0258235 A1 Dec. 23, 2004

(51) Int. Cl.
 *H04M 1/24* (2006.01)
 *H04M 1/00* (2006.01)
 *H04M 3/00* (2006.01)
(52) U.S. Cl. .................. 379/1.04; 379/377; 379/27.01; 379/27.03; 379/27.08
(58) Field of Classification Search ............... 379/377, 379/1.04, 27.01, 27.03, 27.08
See application file for complete search history.

(56) References Cited

U.S. PATENT DOCUMENTS

| | | | | |
|---|---|---|---|---|
| 6,549,587 B1 * | 4/2003 | Li | .............................. | 375/326 |
| 6,570,912 B1 * | 5/2003 | Mirfakhraei | ................ | 375/222 |
| 6,671,312 B1 * | 12/2003 | Lanier et al. | ............... | 375/222 |
| 2002/0034220 A1 * | 3/2002 | Duxbury | ..................... | 375/222 |

* cited by examiner

*Primary Examiner*—Fan Tsang
*Assistant Examiner*—Ramnandan Singh
(74) *Attorney, Agent, or Firm*—Blakely, Sokoloff, Taylor & Zafman LLP

(57) ABSTRACT

Embodiments of the invention provide methods and apparatuses to determine the characteristics of a local loop using the multi-tone line-probing signals of a standard voice-based modem. For one embodiment, the multi-tone, line-probing signals of a voice-band modem are transmitted over a local loop and received at a standard voice band modem. Discrete Fourier transform values are determined for each of two or more frequencies of the plurality of frequencies of the multi-tone signals. A set of discrete Fourier transform values corresponding to a set of high frequencies is summed to obtain a first value and a set of discrete Fourier transform values corresponding to a set of low frequencies is summed to obtain a second value. A power ratio is determined by dividing the first value by the second value. The power ratio is then used to determine a characteristic of the local loop.

29 Claims, 8 Drawing Sheets

METHODS AND APPARATUSES FOR DETERMINING LOOP CHARACTERISTICS USING STANDARD VOICE-BAND MODEM

FIELD

Embodiments of the invention relate generally to the field of broadband communication and, more specifically, to methods and apparatuses for determining the loop characteristics of a local loop to determine if the local loop supports a broadband connection.

BACKGROUND

Broadband is a form of telecommunication that employs a wide band of frequencies that allows data to be multiplexed and transmitted concurrently over different frequencies within the band. This allows more data to be transmitted at one time. Broadband technology uses frequencies that typically range from approximately 25 KHz to approximately 1.1 MHz. There are many impediments to establishing broadband communication connections over typical telecommunications networks. A typical telecommunications network supports voice-band communication. The voice-band is the range of frequencies that is generally audible and used for the transmission of speech (i.e., approximately 300 Hz–4000 kHz). A typical telecommunications system is comprised of a central office ("CO") and a connecting network (local loop). FIG. 1 illustrates a typical telephone network in accordance with the prior art. Network 100, shown in FIG. 1 includes COs 110a–110c that are connected to individual end-users, 150a and 150b, through a main distribution frame ("MDF") 130. A twisted pair of copper wires 140 typically connects the MDF 130 and the end-users and comprises the local loop. Local loops are generally designed for voice-band communication. Each CO, 110a–110c is interconnected through inter-CO network 160.

The CO contains the necessary switching equipment and the local loop is the intermediate network between the CO and the terminating equipment, commonly referred to as customer premises equipment ("CPE"), of the end-user. CPE may include terminals, telephones, modems, etc. that are installed at the end-user's premises and connected to the telecommunications system.

A common type of broadband connection is a digital subscriber line ("DSL"). DSL provides high-speed data access (for example, high speed Internet access). The cost is low because DSL works on existing copper telephone wires, obviating the need for costly installation of higher-grade cable.

In a typical telephone network, some local loops will support a broadband connection and some will not. That is, a local loop of a typical telecommunications system may have various characteristics that preclude or impair a DSL or other broadband connection.

Loading Coil

A typical telephone connection traverses several COs and several local loops. A loading coil is used on the telephone line to boost the power over long distances. The loading coil prevents higher frequencies from passing. Broadband, however, uses the higher frequencies and, therefore, a telephone line having a loading coil cannot support a broadband connection. Typically, a loading coil will be employed where the CPE is approximately 18,000 feet from the CO.

Loop Length

Where a loading coil is not present on the telephone line, a broadband connection can be established. However, the local loop length affects the data transmission rate. Signals from multiple DSL connections are sent to a DSL access multiplexer ("DSLAM") for routing through a high-speed backbone (e.g., asynchronous transfer mode ("ATM")). The DSLAM is typically located at the CO, and therefore, the farther the end-user is from the CO, the lower the data transfer rate is due to the copper wires. For example, asynchronous DSL ("ADSL"), used for Internet and web access, has a downstream data transmission rate of 8.448 Mbps at 9,000 ft., but only 1.544 Mbps at 18,000 ft. for typical wire gauge (e.g., 26 American wire gage ("AWG")). Eventually a point is reached where the CO cannot provide a DSL connection to the CPE. Most forms of DSL have a practical limit of 18,000 ft.

The end-user's telephone line may have other characteristics (e.g., crosstalk) that affect whether a broadband connection can be established and, if so, at what data transmission rate.

Once the characteristics of the telephone line are known, if the telephone line supports a broadband connection, one may be implemented. If the telephone line does not support a broadband connection, then remedial action may be taken. For example, if the characteristics precluding or degrading a broadband connection include the presence of a loading coil or excessive local loop length, the telephone company may implement another CO as necessary to enable broadband connections.

Typically, determining the characteristics of a telephone line requires a technician to go to the location of the CPE to evaluate the telephone line. This evaluation process may include installing a broadband modem on the telephone line to determine if a broadband connection is supported. Such an evaluation method is costly and time-consuming.

Methods of determining loop characteristics using information sequences exchanged between voice-band modems ("VBMs") during handshaking have not been very accurate.

BRIEF DESCRIPTION OF THE DRAWINGS

The invention may be best understood by referring to the following description and accompanying drawings that are used to illustrate embodiments of the invention. In the drawings.

DETAILED DESCRIPTION

Overview

Embodiments of the invention provide methods and apparatuses for automatically determining loop characteristics pertinent to broadband connection support. One embodiment is an algorithm implemented to use the line-probing multi-tone signal of a standard VBM handshaking to determine loop characteristics. For such an embodiment, a software algorithm may be added to the current software of the standard VBM, thus obviating the need for hardware upgrade.

For one embodiment of the invention, a system is provided that provides a VBM mode and broadband modem ("BBM") mode. For such an embodiment, the system uses the standard voice-band modem to determine the telephone line characteristics. Once a determination is made that the telephone line supports a broadband connection, the system switches from the VBM mode to the BBM mode to enable the broadband connection.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Process

Standard VBMs exchange information with each other to effect handshaking and training procedures. This information is exchanged through signals known as information sequences in four different phases. During the training phase both of the VBMs transmit a line-probing signal that roughly describes the loop characteristics. The line-probing signals are multi-tone signals consisting of all of the tones from 150 Hz to 3750 Hz in 150 Hz-increments (excluding tones at 900 Hz, 1200 Hz, 1800 Hz, and 2400 Hz).

In accordance with one embodiment of the invention, the power spectral density ("PSD") derived from the line probing signals is used to determine loop characteristics.

Loading Coil

Figure 2:
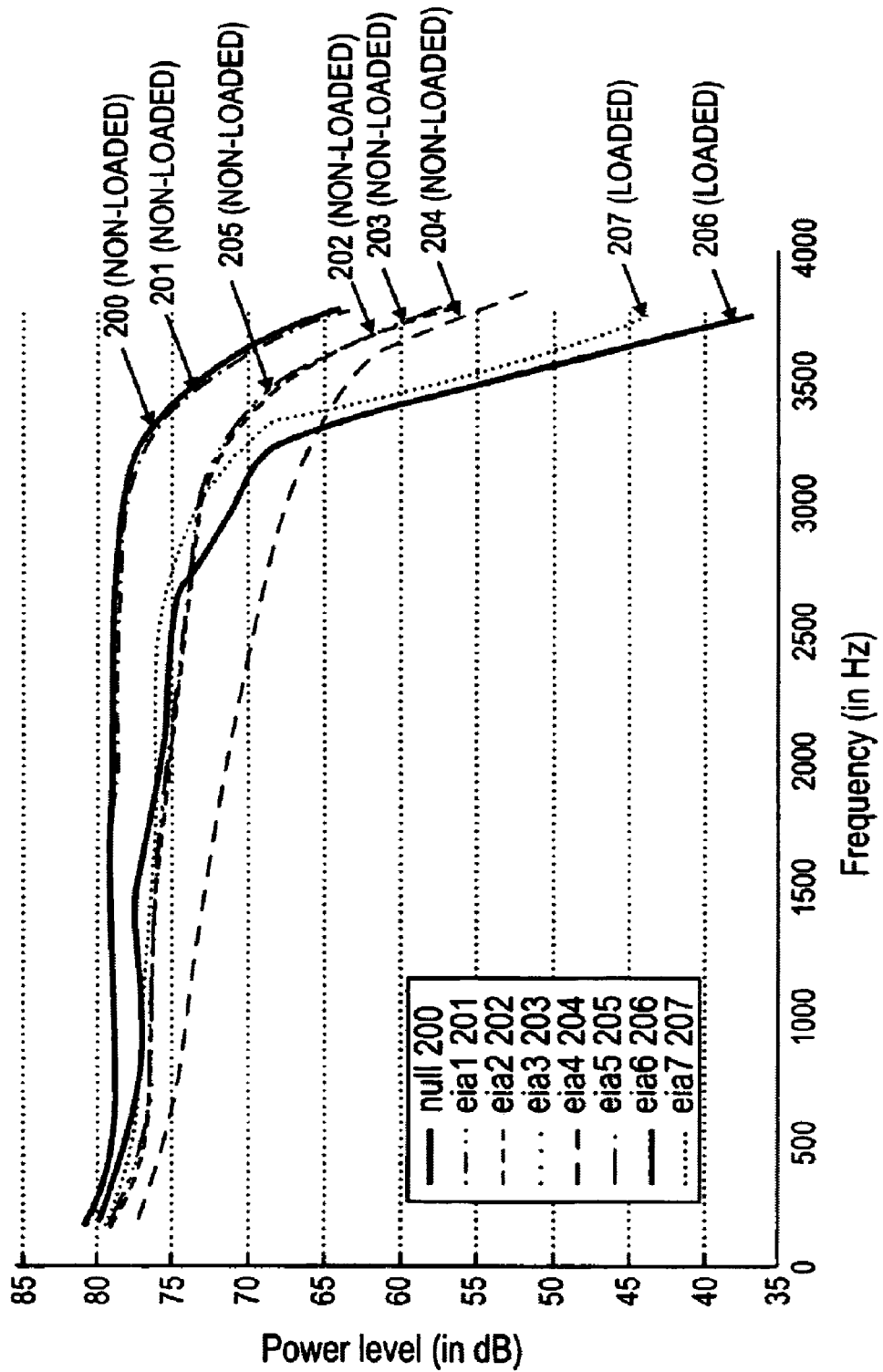
FIG. 2 illustrates the power spectral density ("PSD") characteristics (relationship between power level and frequency) for loaded and non-loaded loops.

FIG. 2 illustrates the PSD characteristics (relationship between power level and frequency) for loaded and non-loaded loops. FIG. 2 describes the power level/frequency relationship for several local loops defined by Electronics Industries Association ("EIA") standards. Graphs 200–205 describe the power level/frequency relationship for non-loaded local loops having various loop lengths, gauge, and other characteristics defined by EIA standards. Graphs 206 and 207 describe the power level/frequency relationship for two loaded local loops having various loop lengths, gauge, and other characteristics defined by EIA standards. As shown in FIG. 2, the power level/frequency graphs for loaded loops (i.e., graphs 206 and 207) are notably different from the power level/frequency graphs for non-loaded loops (i.e., graphs 200–205). This difference allows the PSD characteristics of the line-probing signals to be used to determine if a loading coil is present on the local loop.

For one embodiment of the invention, the power ratio characteristics of loaded and non-loaded loops are compared to provide a more distinguishing characteristic to determine the presence or absence of a loading coil. For one embodiment, the ratio of the high frequency power to the low frequency power is used.

Figure 3:
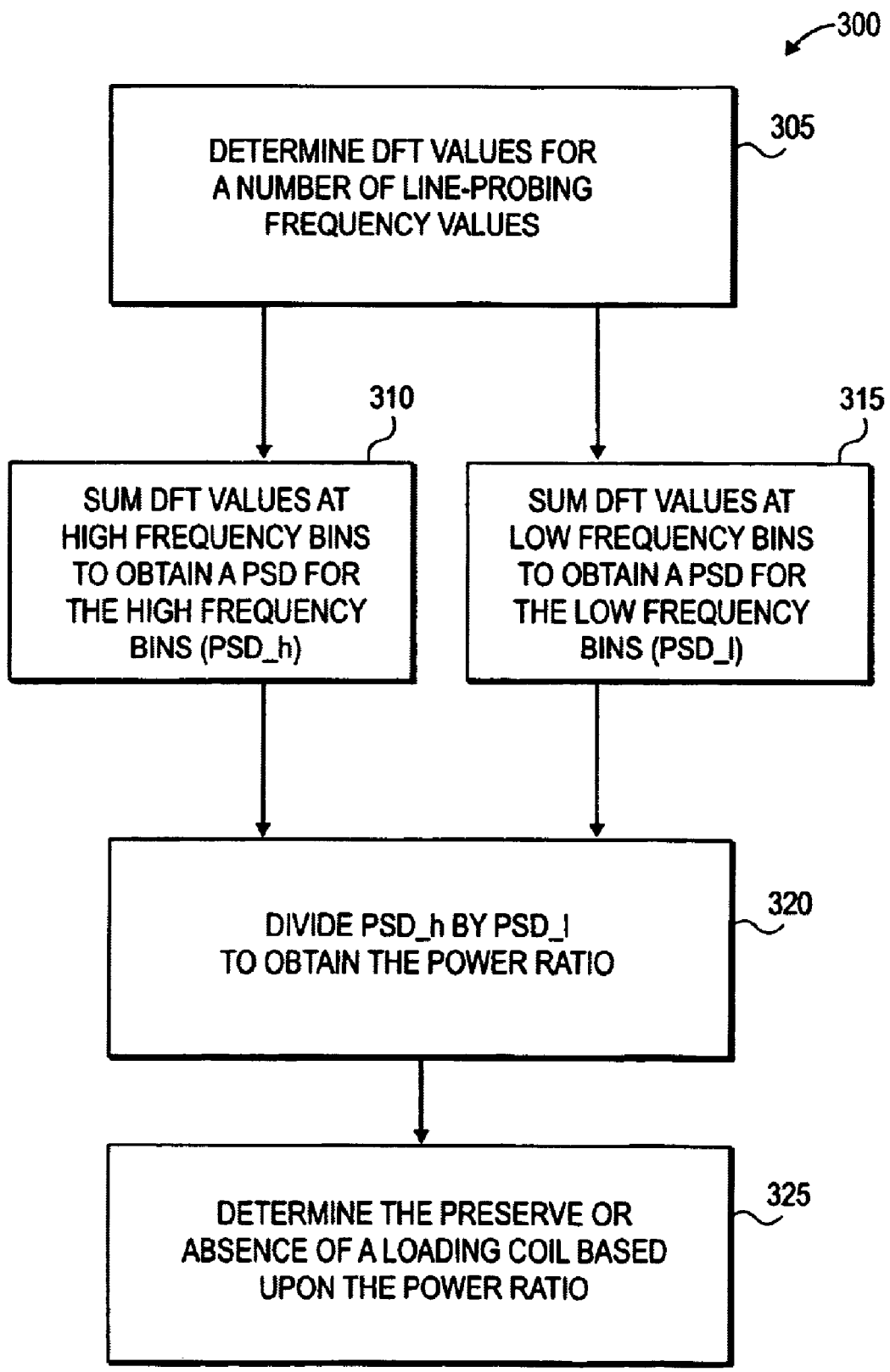
FIG. 3 illustrates a process by which a determination of the presence of a loading coil on a local loop is made in accordance with one embodiment of the invention.

FIG. 3 illustrates a process by which a determination of the presence of a loading coil on a local loop is made in accordance with one embodiment of the invention. Process 300, shown in FIG. 3, begins with operation 305 in which discrete Fourier transform ("DFT") values are determined for a number of line-probing frequency values.

At operation 310, the amplitudes of a number of DFT values at high frequency bins are summed to obtain a PSD for the high frequency bins ("PSD-h").

At operation 315, the amplitudes of a number of DFT values at low frequency bins are summed to obtain a PSD for the low frequency bins ("PSD-l").

At operation 320, the PSD-h is divided by PSD-l to obtain the power ratio ("POWratio").

At operation 325, the presence or absence of a loading coil is determined by the value of the POWratio. For example, by using low frequency bins of 1500 Hz, 1600 Hz, and 1950 Hz, and high frequency bins of 3450 Hz, 3600 Hz, and 4750 Hz, non-loaded loops have a POWratio of no less than approximately −13 dB, while loaded loops have a POWratio of no more than approximately −23 dB for a 10 dB differential.

Figure 4:
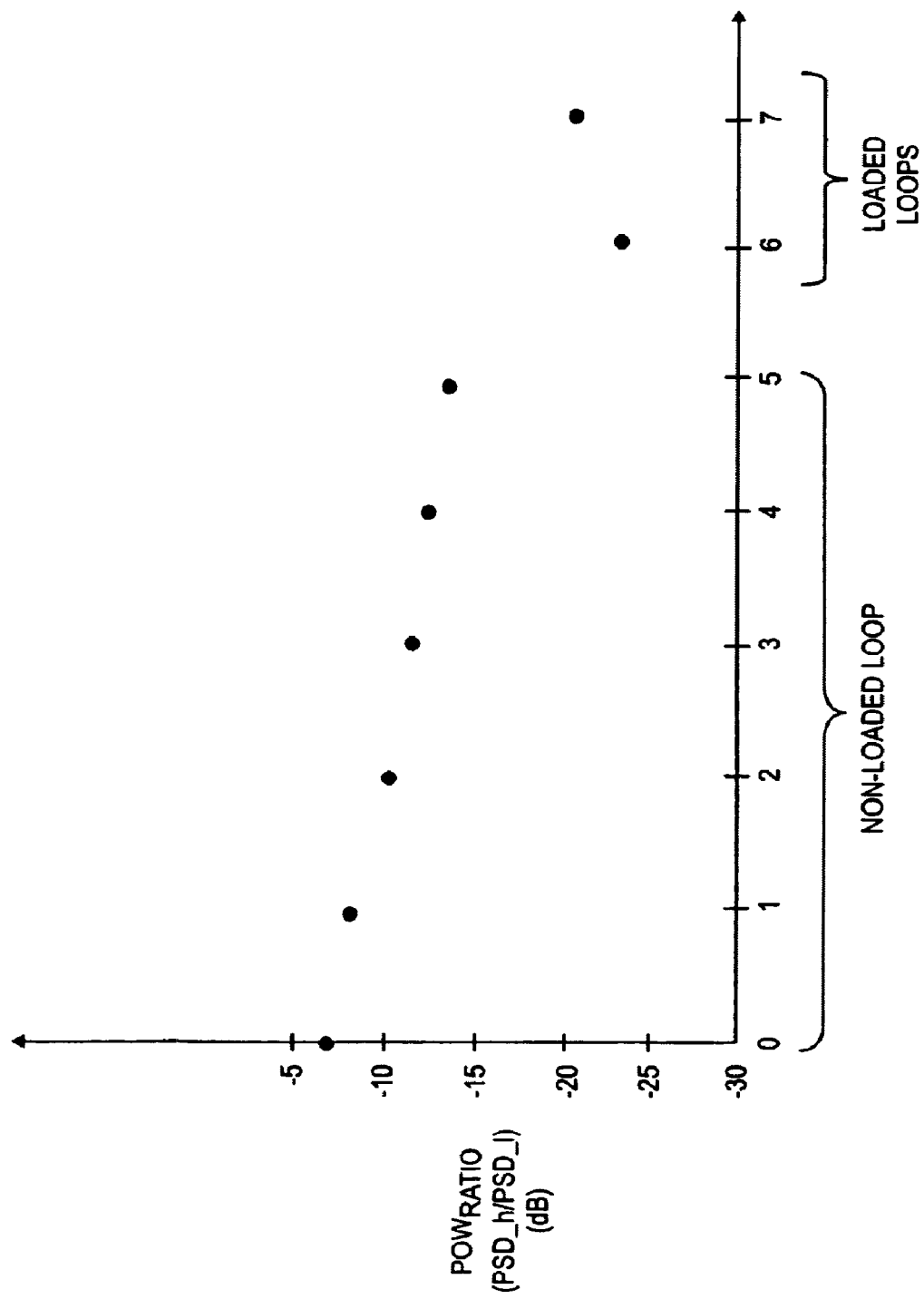
FIG. 4 illustrates the relationship between the high frequency power to the low frequency power ratio and the presence or absence of a loading coil in accordance with one embodiment of the invention.

FIG. 4 illustrates the relationship between the high frequency power to the low frequency power ratio and the presence or absence of a loading coil in accordance with one embodiment of the invention. In FIG. 4, the POWratio was calculated for low frequency bins of 1500 Hz, 1600 Hz, and 1950 Hz, and high frequency bins of 3450 Hz, 3600 Hz, and 3750 Hz. As shown in FIG. 4, non-loaded loops 0–5, corresponding to a null loop and EIA standard loops EIA1–EIA5, respectively, all have a power ratio at or above −13 dB for the given low frequency bins and high frequency bins. The loaded loops 6 and 7, corresponding to EIA standard loops EIA6 and EIA7, respectively, both have a power ratio at or below −23 dB. Therefore, for such an embodiment, the algorithm of the present invention may determine that a loop does not have a loading coil on it if the power ratio is above a specified value (e.g., −15 dB), and conversely determine that a loop does have a loading coil on it if the power ratio is below a specified value (e.g., −20 dB).

Loop Length

Figure 5:
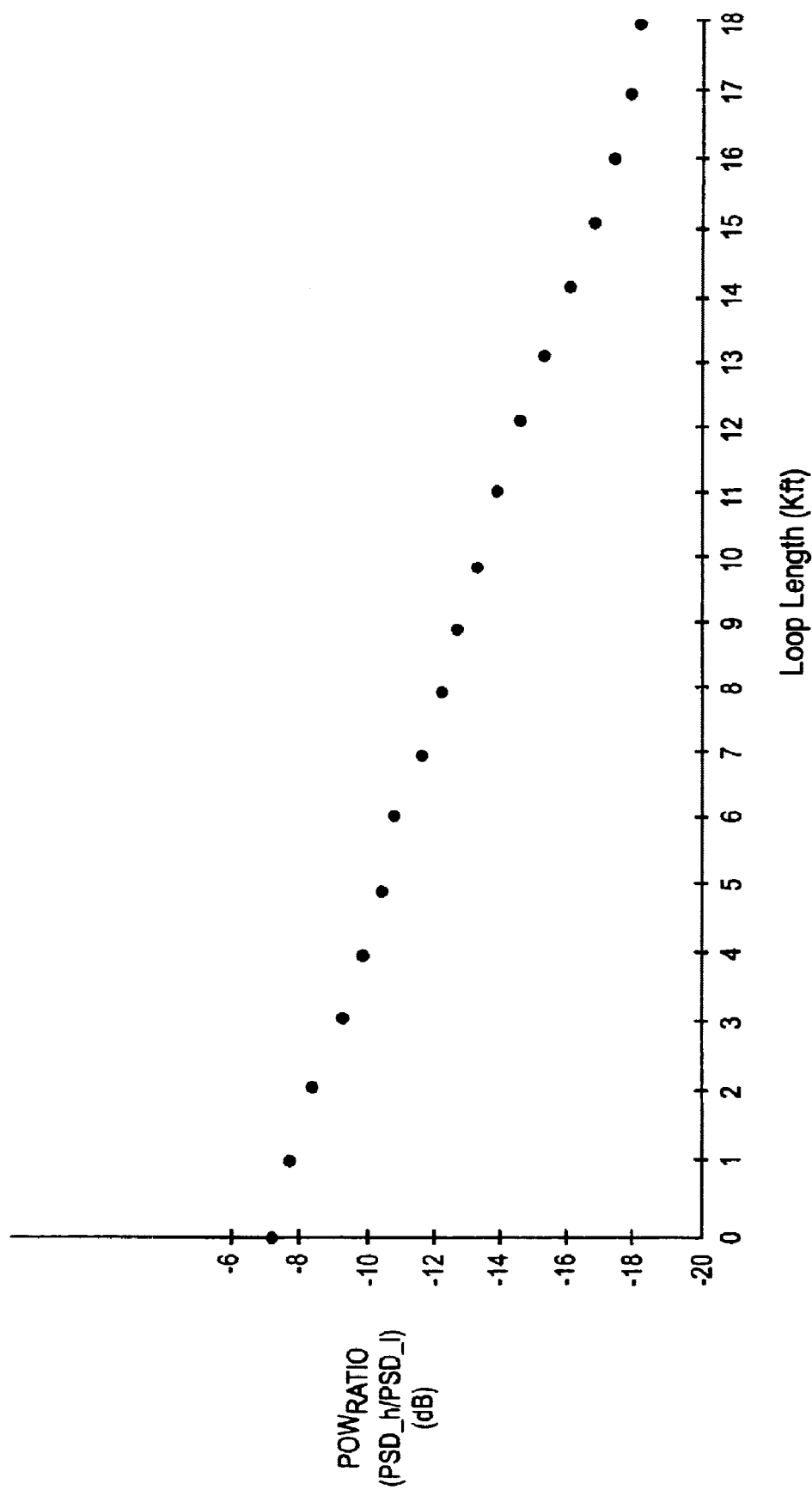
FIG. 5 illustrates the relationship between the high frequency power to the low frequency power ratio and the loop length for 26 AWG loops of various sizes.

The power ratio of high frequency powers to low frequency powers discussed above in reference to FIGS. 3 and 4 can also be used to determine loop length. FIG. 5 illustrates the relationship between the high frequency power to low frequency power ratio and the loop length for 26 AWG loops of various sizes. In FIG. 5, the POWratio was calculated for low frequency bins of 600 Hz, 750 Hz, and 1050 Hz and high frequency bins of 3450 Hz, 3600 Hz, and 3750 Hz. The lower frequency bins of 300 Hz, 450 Hz, and 600 Hz, were avoided to maintain stability. As shown in FIG. 5, as loop length changed from 0–18 kft., the POWratio changed from approximately −8 dB to approximately −18 dB, in increments of approximately −0.5 dB/kft., thus providing a relatively accurate determination of loop length.

Figure 7:
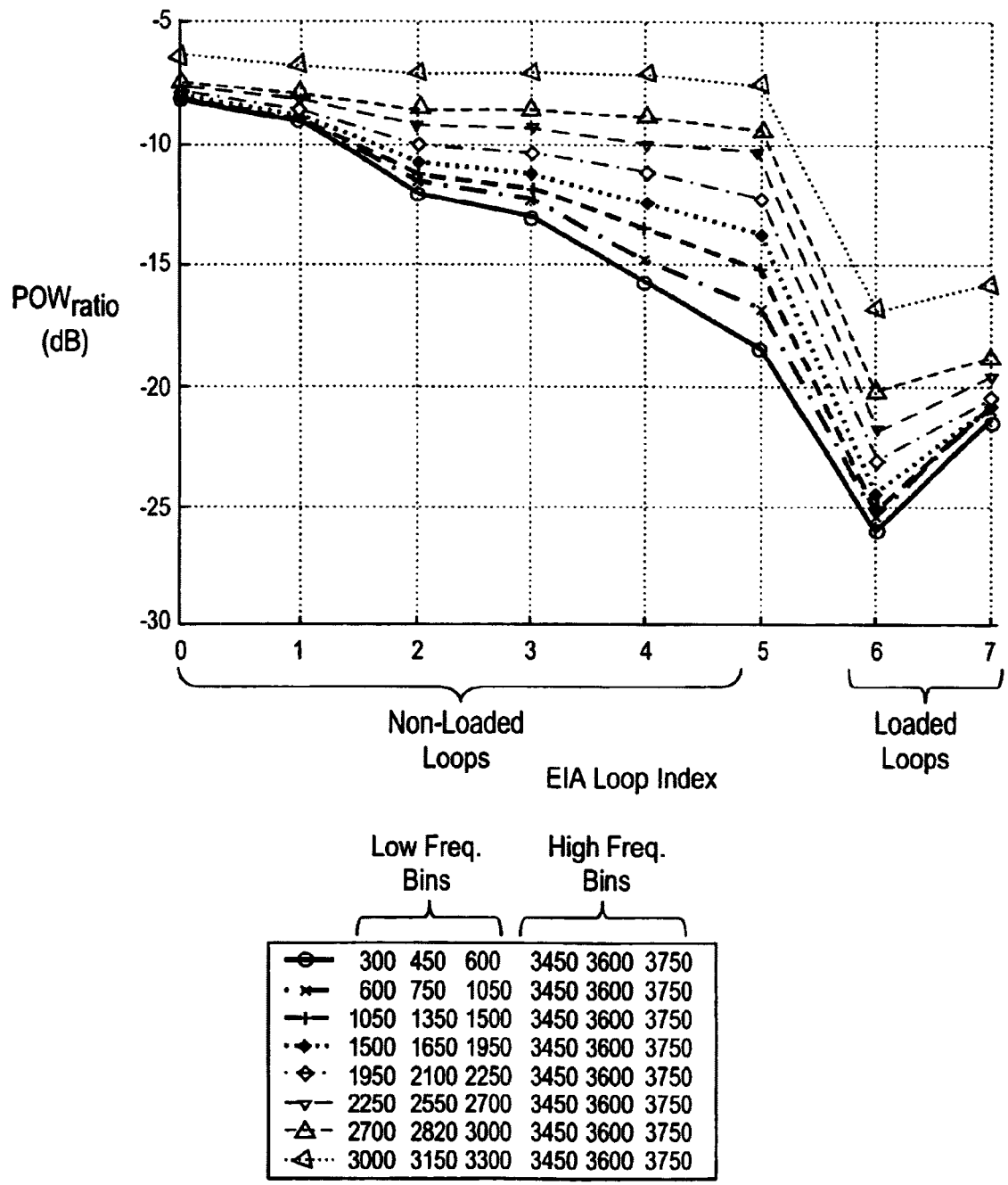
FIG. 7 illustrates the effect frequency bin values have on distinguishing the presence or absence of a loading coil on a loop.
Figure 8:
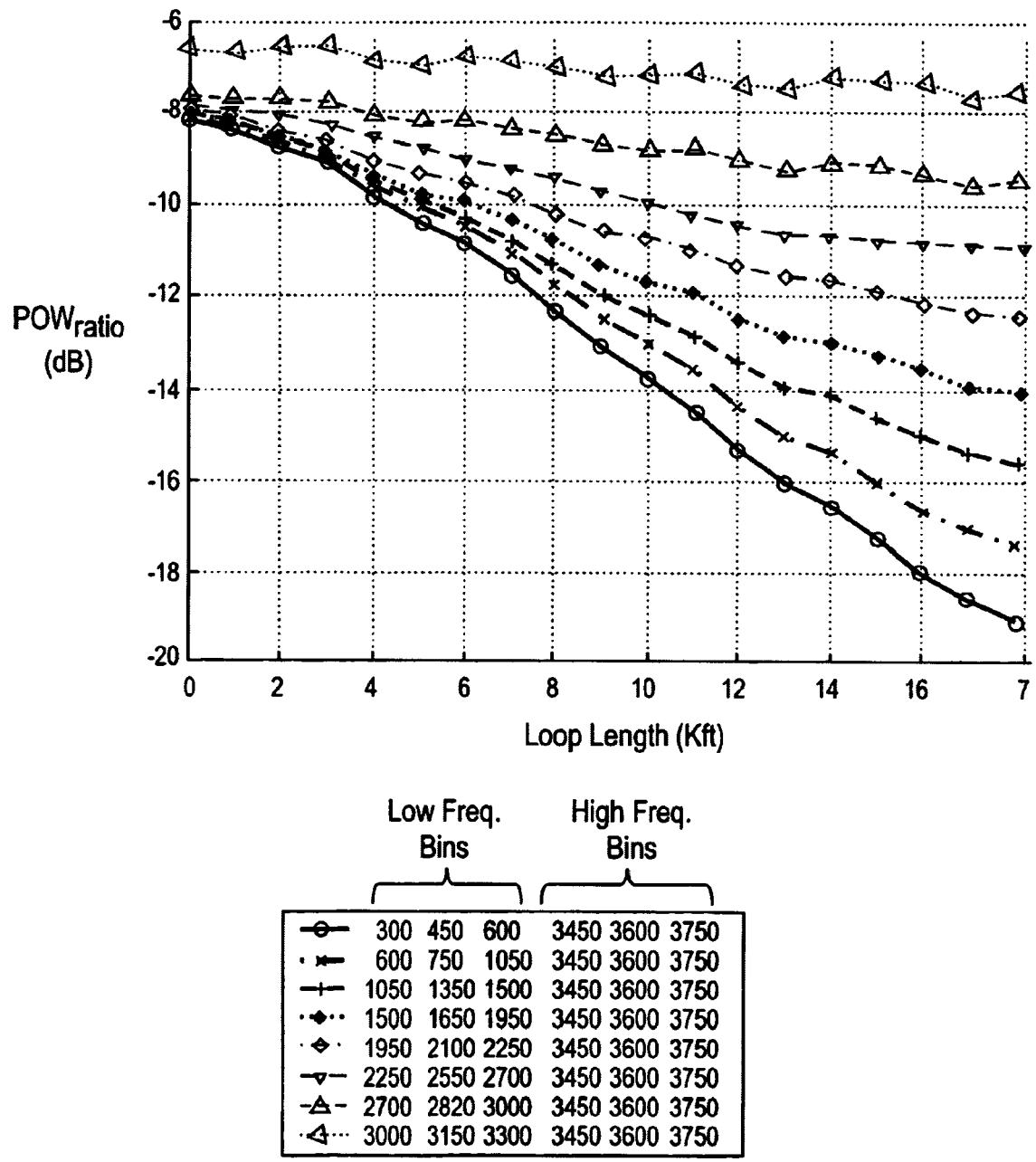
FIG. 8 illustrates the effect frequency bin values have on distinguishing the loop length.

The selected low frequency bins and high frequency bins may vary depending upon which loop characteristic is being determined. For example, as discussed above in reference to FIG. 4, low frequency bins of 1500 Hz, 1600 Hz, and 1950 Hz, and high frequency bins of 3450 Hz, 3600 Hz, and 3750 Hz distinguished loaded loops from non-loaded loops by approximately 10 dB. These frequency bin values did not provide optimal distinction for loop length determination. Conversely, the frequency bins used for loop length determination, described in FIG. 5, namely low frequency bins of 600 Hz, 750 Hz, and 1050 Hz and high frequency bins of 3450 Hz, 3600 Hz, and 3750 Hz, distinguished loaded loops from non-loaded loops by only approximately 4–5 dB. FIG. 7 illustrates the effect frequency bin values have on distinguishing the presence or absence of a loading coil on a loop. FIG. 8 illustrates the effect frequency bin values have on distinguishing the loop length.

General Matters

Embodiments of the invention provide methods and apparatuses for determining loop characteristics using a standard VBM, as described above. For one embodiment, the loop characteristic determination may be made in response to a user request. In alternative embodiments the loop characteristic determination may be made automatically. For one embodiment, the algorithm of the invention may be implemented as a software addition to the software of an existing standard VBM.

Figure 1:
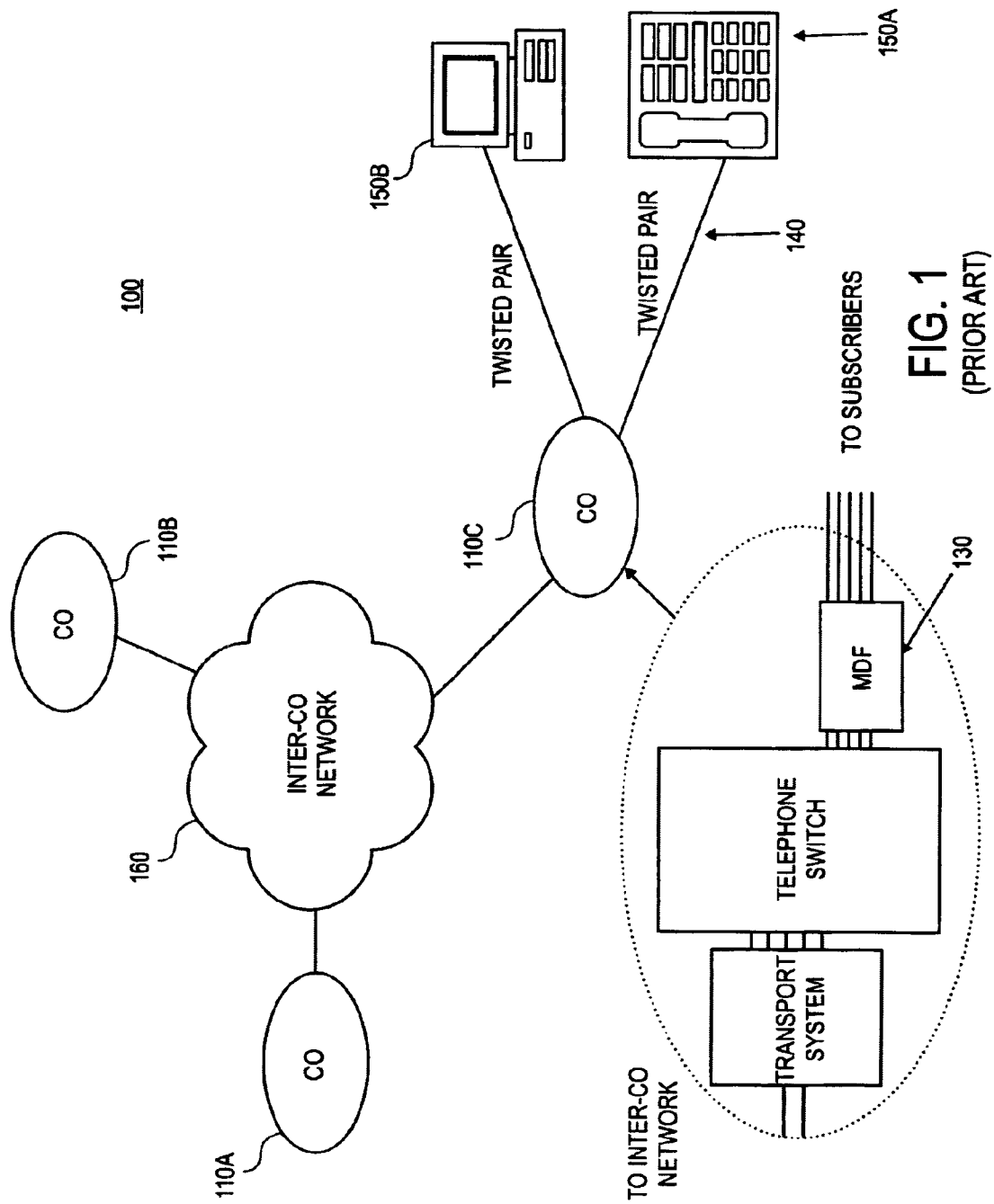
FIG. 1 illustrates a typical telephone network in accordance with the prior art.
Figure 6:
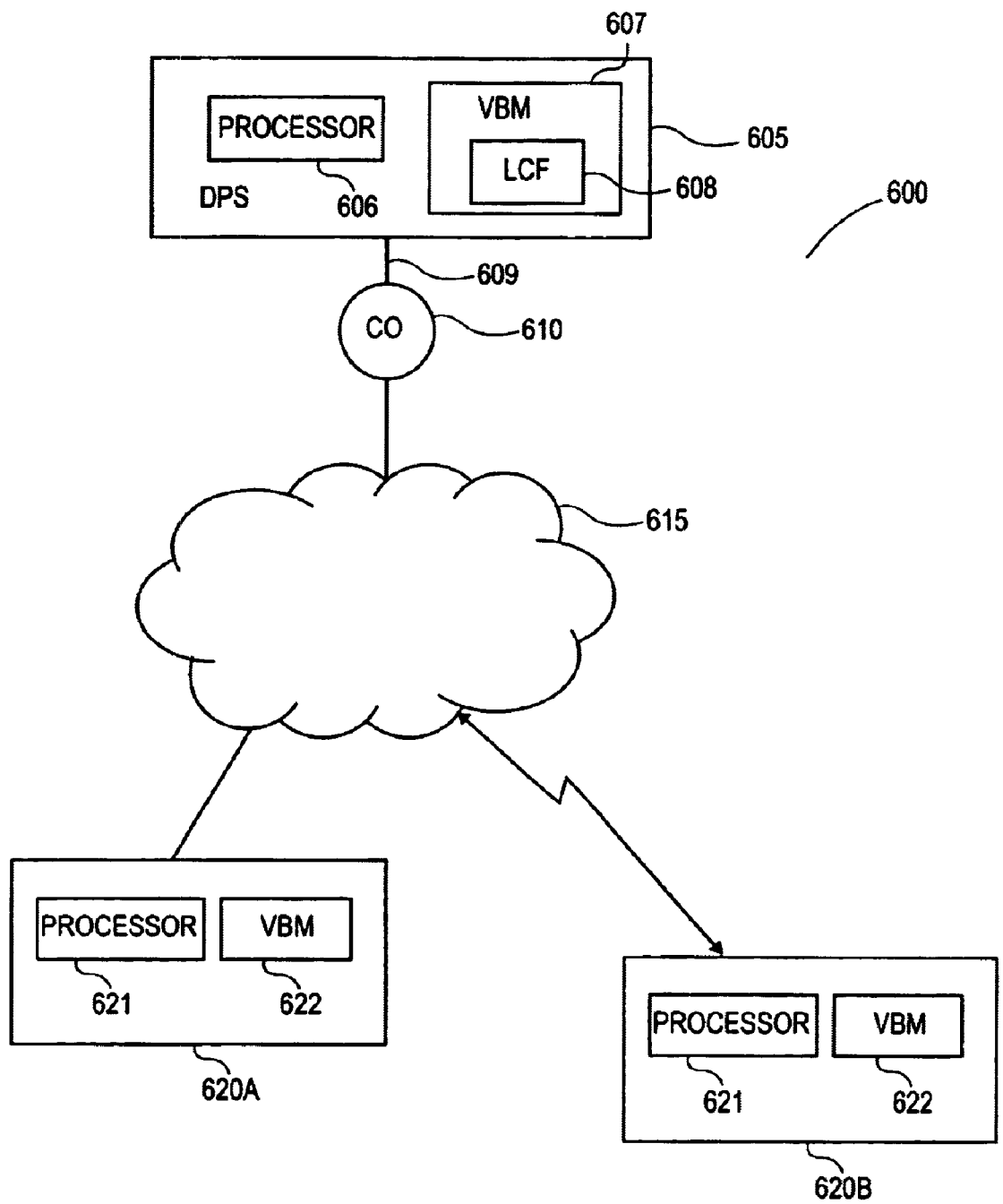
FIG. 6 illustrates a network of computing systems in which the methods and the apparatuses described may be implemented and used in accordance with one embodiment of the invention.

FIG. 6 illustrates a network of computing systems in which the methods and apparatuses described may be implemented and used in accordance with one embodiment of the invention. Network 600 includes a computing system (digital processing system) 605 coupled to a CO 610 through a local loop 609 and coupled to other computing systems 620a and 620b through an Internet 615 as shown. The Internet 615 is a network of networks through which information is exchanged via the use of protocols (e.g., TCP, IP) as known in the art. Additionally or alternatively, the central computing system 605 may be coupled to external computing systems over long distances via telephone lines or satellite links as part of a wide area network. For purposes of illustrating an embodiment of the invention, network 600 may be viewed as a telecommunications network as described above in reference to FIG. 1. Computing system 605 includes a processor 606 and a VBM 607 having a loop characterization function ("LCF") 608. In accordance with one embodiment, the LCF 608 uses the PSD of the line-probing multi-tone signals to determine loop characteristics as described above.

Embodiments of the invention include various operations. It will be apparent to those skilled in the art that the operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. Embodiments of the invention may be provided as computer program products that may include a machine-readable medium having stored thereon instructions, which may be used to program a computer (or other electronic devices) to perform a process according to an embodiment of the invention. The machine-readable medium may include, but is not limited to, floppy diskettes, optical disks, CD-ROMs, magneto-optical disks, ROMs, RAMs, EPROMs, EEPROMs, magnetic or optical cards, flash memory, or other types of media/machine-readable medium suitable for storing electronic instructions. Moreover, embodiments of the invention may also be downloaded as a computer program product, wherein the program may be transferred from a remote computer to a requesting computer by way of data signals embodied in a carrier wave or other propagation medium via a communication cell (e.g., a modem or network connection).

Many of the methods are described in their most basic form but operations can be added to or deleted from any of the methods without departing from the basic scope of the invention.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   receiving one or more multi-tone signals at a voice-band modem, the signals transmitted over a local loop, the multi-tone signals containing a plurality of frequencies;
   determining a discrete Fourier transform value for each of two or more frequencies of the plurality of frequencies;
   summing a set of discrete Fourier transform values corresponding to a set of high frequencies to obtain a first power spectral density value and summing a set of discrete Fourier transform values corresponding to a set of low frequencies to obtain a second power spectral density value; and
   determining a characteristic of the local loop based upon the first power spectral density value and the second power spectral density value, wherein the characteristic of the local loop is the presence of a loading coil or a length of a local loop.

2. The method of claim 1 wherein determining a characteristic of the local loop based upon the first power spectral density value and the second power spectral density value includes dividing the first power spectral density value by the second power spectral density value to obtain a power ratio value and determining a characteristic of the local loop based upon the power ratio value.

3. The method of claim 2 wherein the set of high frequencies comprises 3450 Hz, 3600 Hz, and 3750 Hz, the set of low frequencies comprises 1500 Hz, 1650 Hz, and 1950 Hz, and the characteristic of the local loop is the presence of a loading coil on the local loop.

4. The method of claim 3 further comprising:
determining a second characteristic of the local loop based upon the power ratio value.

5. The method of claim 4 wherein the characteristic of the local loop is the presence of a loading coil on the local loop and the second characteristic of the local loop is the length of the local loop.

6. The method of claim 2 wherein determining a characteristic of the local loop based upon the power ratio value comprises determining the presence of a loading coil on the local loop if the power ratio is below a first specified value and determining the absence of a loading coil on the local loop if the power ratio is above a second specified value, the first specified value and the second specified value based upon the set of high frequencies and the set of low frequencies.

7. The method of claim 6 wherein the set of high frequencies comprises 3450 Hz, 3600 Hz, and 3750 Hz, the set of low frequencies comprises 1500 Hz, 1650 Hz, and 1950 Hz, the first specified value is −20 dB, and the second specified value is −15 dB.

8. The method of claim 2 wherein the set of high frequencies comprises 3450 Hz, 3600 Hz, and 3750 Hz, the set of low frequencies comprises 600 Hz, 750 Hz, and 1050 Hz, and the characteristic of the local loop is a length of the local loop.

9. The method of claim 1 further comprising:
determining a broadband connection support capability of the local loop based upon the determination of the characteristic of the local loop; and
displaying the results of the determination of broadband connection support.

10. The method of claim 9 wherein determining a broadband connection support capability of the local loop based upon the determination of the characteristic of the local loop comprises determining that the local loop supports a broadband connection if the power ratio is above a specified value, the specified value based upon the set of high frequencies and the set of low frequencies.

11. A machine-readable medium that provides executable instructions, which when executed by a processing system, cause said processing system to perform a method, the method comprising:
receiving one or more multi-tone signals at a voice-band modem, the signals transmitted over a local loop, the multi-tone signals containing a plurality of frequencies;
determining a discrete Fourier transform value for each of two or more frequencies of the plurality of frequencies;
summing a set of discrete Fourier transform values corresponding to a set of high frequencies to obtain a first power spectral density value and summing a set of discrete Fourier transform values corresponding to a set of low frequencies to obtain a second power spectral density value; and
determining a characteristic of the local loop based upon the first power spectral density value and the second power spectral density value, wherein the characteristic of the local loop is the presence of a loading coil or a length of a local loop.

12. The machine-readable medium of claim 11 wherein determining a characteristic of the local loop based upon the first power spectral density value and the second power spectral density value includes dividing the first power spectral density value by the second power spectral density value to obtain a power ratio value and determining a characteristic of the local loop based upon the power ratio value.

13. The machine-readable medium of claim 12 wherein the set of high frequencies comprises 3450 Hz, 3600 Hz, and 3750 Hz, the set of low frequencies comprises 1500 Hz, 1650 Hz, and 1950 Hz, and the characteristic of the local loop is the presence of a loading coil on the local loop.

14. The machine-readable medium of claim 12 wherein determining a characteristic of the local loop based upon the power ratio value comprises determining the presence of a loading coil on the local loop if the power ratio is below a first specified value and determining the absence of a loading coil on the local loop if the power ratio is above a second specified value, the first specified value and the second specified value based upon the set of high frequencies and the set of low frequencies.

15. The machine-readable medium of claim 12 wherein the method further comprises:
determining a second characteristic of the local loop based upon the power ratio value.

16. The machine-readable medium of claim 15 wherein the characteristic of the local loop is the presence of a loading coil on the local loop, and the second characteristic of the local loop is the length of the local loop.

17. The machine-readable medium of claim 12 wherein the method further comprises:
determining a broadband connection support capability of the local loop based upon the determination of the characteristic of the local loop; and
displaying the results of the determination of broadband connection support.

18. An apparatus comprising:
a processor;
a memory coupled to the processor, the memory having stored thereon one or more executable instructions, which when executed by the processor cause the processor to perform a method comprising:
receiving one or more multi-tone signals at a voice-band modem, the signals transmitted over a local loop, the multi-tone signals containing a plurality of frequencies;
determining a discrete Fourier transform value for each of two or more frequencies of the plurality of frequencies,
summing a set of discrete Fourier transform values corresponding to a set of high frequencies to obtain a first power spectral density value and summing a set of discrete Fourier transform values corresponding to a set of low frequencies to obtain a second power spectral density value; and
determining a characteristic of the local loop based upon the first power spectral density value and the second power spectral density value, wherein the characteristic of the local loop is the presence of a loading coil or a length of local loop.

19. The machine-readable medium of claim 18 wherein determining a characteristic of the local loop based upon the first power spectral density value and the second power spectral density value includes dividing the first power spectral density value by the second power spectral density value to obtain a power ratio value and determining a characteristic of the local loop based upon the power ratio value.

20. The apparatus of claim 19 wherein determining a characteristic of the local loop based upon the power ratio value comprises determining the presence of a loading coil on the local loop if the power ratio is below a first specified value and determining the absence of a loading coil on the local loop if the power ratio is above a second specified value, the first specified value and the second specified value based upon the set of high frequencies and the set of low frequencies.

21. The apparatus of claim 20 wherein the set of high frequencies comprises 3450 Hz, 3600 Hz, and 3750 Hz, the set of low frequencies comprises 1500 Hz, 1650 Hz, and 1950 Hz, the first specified value is −20 dB, and the second specified value is −15 dB.

22. The apparatus of claim 19 wherein the set of high frequencies comprises 3450 Hz, 3600 Hz, and 3750 Hz, the set of low frequencies comprises 600 Hz, 750 Hz, and 1050 Hz, and the characteristic of the local loop is a length of the local loop.

23. The apparatus of claim 19 wherein the method further comprises:
determining a second characteristic of the local loop based upon the power ratio value.

24. The apparatus of claim 23 wherein the characteristic of the local loop is the presence of a loading coil on the local loop, and the second characteristic of the local loop is the length of the local loop.

25. The apparatus of claim 19 wherein the method further comprises:
determining a broadband connection support capability of the local loop based upon the determination of the characteristic of the local loop; and
displaying the results of the determination of broadband connection support.

26. An apparatus to determine characteristics of a local loop, the apparatus to
receive one or more multi-tone signals at a voice-band modem, the signals transmitted over a local loop, the multi-tone signals containing a plurality of frequencies;
determine a discrete Fourier transform value for each of two or more frequencies of the plurality of frequencies, sum a set of discrete Fourier transform values corresponding to a set of high frequencies to obtain a first power spectral density value and summing a set of discrete Fourier transform values corresponding to a set of low frequencies to obtain a second power spectral density value; and
determine a characteristic of the local loop based upon the first power spectral density value and the second power spectral density value, wherein the characteristic of the local loop is the presence of a loading coil or a length of a local loop.

27. The apparatus of claim 26 wherein determining a characteristic of the local loop based upon the first power spectral density value and the second power spectral density value includes dividing the first power spectral density value by the second power spectral density value to obtain a power ratio value and determining a characteristic of the local loop based upon the power ratio value.

28. An apparatus comprising:
a processor;
a voice-band modem coupled to the processor, the voice-band modem including a loop characterization function to receive one or more multi-tone signals at a voice-band modem, the signals transmitted over a local loop, the multi-tone signals containing a plurality of frequencies, determine a discrete Fourier transform value for each of two or more frequencies of the plurality of frequencies, sum a set of discrete Fourier transform values corresponding to a set of high frequencies to obtain a first power spectral density value and to sum the a set of discrete Fourier transform values corresponding to a set of low frequencies to obtain a second power spectral density value, and determine a characteristic of the local loop based upon the first power spectral density value and the second value, wherein the characteristic of the local loop is the presence of a loading coil or a length of a local loop.

29. The apparatus of claim 28 wherein determining a characteristic of the local loop based upon the first power spectral density value and the second power spectral density value includes dividing the first power spectral density value by the second power spectral density value to obtain a power ratio value and determining a characteristic of the local loop based upon the power ratio value.

* * * * *